(12) United States Patent
Ramakrishnan

(10) Patent No.: US 9,553,747 B2
(45) Date of Patent: Jan. 24, 2017

(54) SYSTEMS AND METHODS FOR SWITCHING QUALITY FACTORS DURING INDUCTIVELY COUPLED COMMUNICATIONS

(71) Applicant: QUALCOMM Incorporated, San Diego, CA (US)

(72) Inventor: Prasannasarathy Ramakrishnan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/580,678

(22) Filed: Dec. 23, 2014

(65) Prior Publication Data

US 2016/0182263 A1    Jun. 23, 2016

(51) Int. Cl.
*H04L 27/04* (2006.01)
*H04B 5/00* (2006.01)
*H01F 38/14* (2006.01)
*H04L 25/02* (2006.01)

(52) U.S. Cl.
CPC .............. *H04L 27/04* (2013.01); *H01F 38/14* (2013.01); *H04B 5/0031* (2013.01); *H04B 5/0037* (2013.01); *H04B 5/0075* (2013.01); *H04L 25/0278* (2013.01)

(58) Field of Classification Search
CPC ... H04B 5/0075; H04B 5/0031; H04B 5/0037; H04L 25/0278; H04L 27/04; H01F 38/14

USPC ........................................................ 455/41.1
See application file for complete search history.

(56) References Cited

U.S. PATENT DOCUMENTS

| | | | |
|---|---|---|---|
| 8,682,261 B2 | 3/2014 | Ozaki et al. | |
| 8,686,887 B2 | 4/2014 | Savoj | |
| 8,829,734 B2 | 9/2014 | Gulak et al. | |
| 2011/0014883 A1* | 1/2011 | Raggam ............ | G06K 19/0723 455/91 |
| 2012/0282857 A1 | 11/2012 | Zhang | |
| 2013/0035034 A1* | 2/2013 | Kim .................... | H04B 5/0037 455/41.1 |
| 2013/0109304 A1 | 5/2013 | Marcu et al. | |
| 2013/0281016 A1* | 10/2013 | Mcfarthing ............. | H04B 5/00 455/41.1 |
| 2014/0049118 A1* | 2/2014 | Karalis .................. | H01F 38/14 307/104 |
| 2014/0323043 A1 | 10/2014 | Shana'A et al. | |

OTHER PUBLICATIONS

International Search Report and Written Opinion—PCT/US2015/061588—ISA/EPO—Feb. 18, 2016.

* cited by examiner

*Primary Examiner* — David B. Lugo
(74) *Attorney, Agent, or Firm* — Austin Rapp & Hardman

(57) ABSTRACT

A method for inductively coupled communications is described. The method includes applying a high loaded quality factor to a matching network of an active transmitter during an amplitude modulation (AM) high state. The method also includes switching to a low loaded quality factor for the matching network during an AM low state.

25 Claims, 11 Drawing Sheets

SYSTEMS AND METHODS FOR SWITCHING QUALITY FACTORS DURING INDUCTIVELY COUPLED COMMUNICATIONS

TECHNICAL FIELD

The present disclosure relates generally to electronic devices. More specifically, the present disclosure relates to systems and methods for switching quality factors during inductively coupled communications.

BACKGROUND

The use of electronic devices has become common. In particular, advances in electronic technology have reduced the cost of increasingly complex and useful electronic devices. Cost reduction and consumer demand have proliferated the use of electronic devices such that they are practically ubiquitous. And, as the use of electronic devices has expanded, so has the demand for new and improved features for them. More specifically, electronic devices that perform new functions and/or perform faster, more efficiently, or with higher quality are often in high demand.

Some electronic devices (e.g., smartphones) transmit wireless signals. Wireless signals may, for example, be utilized to communicate with other electronic devices. For instance, the wireless signals may convey voice information or data. In some implementations, the wireless communication may be over an inductive coupling between devices. The size of the antennas and the mobility (i.e., relative motion) of the transmitter and receiver may affect the wireless signals. As the size of antennas decreases, inductive coupling factors may also reduce. Furthermore, as data rates increase, the power transfer from an electronic device may be reduced To compensate for the reduced antenna size and to improve power transfer for high data rates, an electronic device may switch quality factors during communication. System and methods for switching quality factors during inductively coupled communications may be beneficial.

SUMMARY

A method is described. The method includes applying a high loaded quality factor to a matching network of an active transmitter during an amplitude modulation (AM) high state. The method also includes switching to a low loaded quality factor for the matching network during an AM low state.

The method may be performed by an initiator near field communication (NFC) device or a target NFC device. The active transmitter may transfer power and may be used in both an initiator mode and a target mode.

The high loaded quality factor and the low loaded quality factor may be produced by changing a source impedance with respect to a matching network impedance. For the high loaded quality factor, there is less mismatch between the source impedance and the matching network impedance than the low loaded quality factor. The high loaded quality factor may be produced by setting the source impedance equal to the matching network impedance. The low loaded quality factor may be produced by setting the source impedance to a mismatch state with respect to the matching network impedance.

The method may also include changing a quality factor of a reactive load on the matching network to produce the high loaded quality factor and the low loaded quality factor.

Components of the matching network may be fixed for different data rates and at least one of a source quality factor and a reactive load quality factor may switch between the AM high state and the AM low state.

The method may also include switching a quality factor of a reactive load between the AM high state and the AM low state. The reactive load may be an inductively coupled target load seen by the transmitter. Switching the quality factor of the reactive load may be done in combination with switching a source quality factor. The method may also include switching the quality factor of the reactive load without switching a source quality factor during low-power transmitter conditions. The low-power transmitter conditions may include using a high-output impedance transmitter.

The method may also include selecting different impedances for the high loaded quality factor based on different data rates. Different impedances for the low loaded quality factor may be selected based on different data rates.

The method may also include selecting an impedance for the high loaded quality factor and an impedance for the low loaded quality factor based on a highest data rate. The selected impedances may be applied to other data rates.

During the AM low state, the transmitter may be modeled as a voltage source with a series impedance. The voltage source may produce zero voltage.

An electronic device is also described. The electronic device includes a processor, memory in electronic communication with the processor, instructions stored in the memory. The instructions are executable by the processor to apply a high loaded quality factor to a matching network of an active transmitter during an AM high state. The instructions are also executable to switch to a low loaded quality factor for the matching network during an AM low state.

An apparatus is also described. The apparatus includes means for applying a high loaded quality factor to a matching network of an active transmitter during an AM high state. The apparatus also includes means for switching to a low loaded quality factor for the matching network during an AM low state.

A computer-program product is also described. The computer-program product includes a non-transitory computer-readable medium having instructions thereon. The instructions include code for causing an electronic device to apply a high loaded quality factor to a matching network of an active transmitter during an AM high state. The instructions also include code for causing the electronic device to switch to a low loaded quality factor for the matching network during an AM low state.

DETAILED DESCRIPTION

Figure 1:
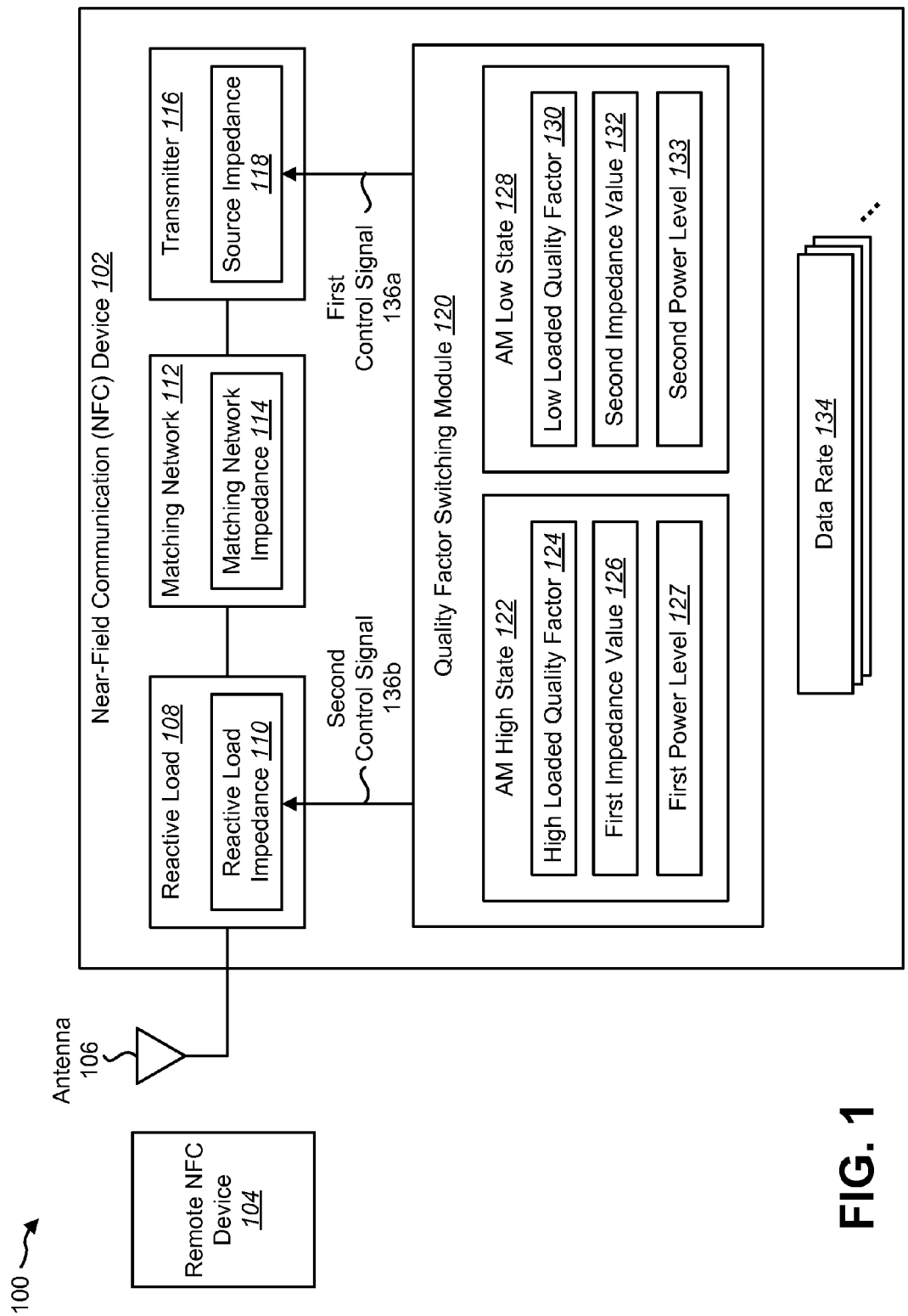
FIG. 1 is a block diagram illustrating one configuration of a wireless communication system in which inductively coupled communication may be implemented.

The systems and methods disclosed herein may be applied to communication devices that communicate wirelessly and/or that communicate using a wired connection or link. For example, some communication devices may communicate with other devices using an Ethernet protocol. In another example, some communication devices may communicate with other devices using wireless communication. In one configuration, the systems and methods disclosed herein may be applied to a communication device that communicates with another device using an induction-based communication technology. One implementation of inductively coupled communication technology is near field communication (NFC).

In one approach for NFC communication, the direction for the data flow in the NFC communication standards is characterized by having an initiator device (also referred to as a poller, polling device, proximity coupling device (PCD) or initiator) provide an electromagnetic field. A target device (also referred to as a listener, listening device, proximity integrated circuit card (PICC) or target) may generate modulation content via a passive load modulation. In passive load modulation (PLM), modulation of the signal may be achieved by switching resistive or reactive elements within the target device.

The trend in electrical devices, especially for mobile applications, is to introduce smaller antenna sizes. However, smaller antennas may exhibit smaller coupling factors for inductively coupled communication. This may make it difficult to achieve specification limits for the load modulation level on the initiator device using passive load modulation with the target device.

To compensate for the deficiencies of passive load modulation, the target device may use active load modulation (ALM). With ALM, alternate circuit approaches are based on synchronizing the target device to the signal from the initiator device. The target device may regenerate the signal received from the initiator device. The target device may then retransmit a phase-synchronized modulated signal to the initiator device. With ALM, the resulting level of the modulation received at the initiator device can be higher than the modulation level produced by a traditional passive (e.g., resistive) load modulation.

With both initiator mode and target mode, there may be a trade-off between power transfer and data rates. With some approaches to inductively coupled communication, the amount of power that is transferred may decrease as data rates increase. To provide for high power transfer and high data rates at the same time, the systems and methods described herein may provide for switching quality factors during inductively coupled communications.

Various configurations are now described with reference to the Figures. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system 100 in which inductively coupled communication may be implemented. The system 100 may include an NFC device 102 and a remote NFC device 104. Examples of electronic devices include wireless communication devices, cellular phones, smartphones, tablet devices, voice recorders, digital cameras, still cameras, camcorders, gaming systems, laptop computers, etc. Each component of the electronic devices described herein (e.g., the NFC device 102 and the remote NFC device 104) may be implemented in hardware (e.g., circuitry) or a combination of hardware and software (e.g., a processor with executable instructions stored in memory).

NFC is an inductively coupled communication. Therefore, the initiator NFC device 102 may also be referred to as an inductively coupled communication device. The antenna 106 of the NFC device 102 produces an electromagnetic field (also referred to as a magnetic field or a radiated field (RF)) that is received by the remote NFC device 104.

The NFC device 102 and the remote NFC device 104 may use one or more NFC signaling technologies to communicate with each other. The NFC signaling technologies may include NFC-A, NFC-B and NFC-F. NFC-A may be referred to as type-A, NFC-B may be referred to as type-B and NFC-F may be referred to as type-F. The NFC signaling technologies differ in the modulation schemes employed.

NFC has four different tag types, which support a subset of the NFC signaling technologies. Type 1 tags (T1T) use NFC-A communication without data collision protection. Type 2 tags (T2T) use NFC-B communication with anti-collision. Type 3 tags (T3T) use NFC-F with anti-collision. Type 4 tags (T4T) can use either NFC-A (T4AT) or NFC-B (T4BT) with anti-collision.

In one configuration, the NFC device 102 and the remote NFC device 104 may be operable to communicate using NFC through various interfaces, such as a frame radio frequency (RF) interface, ISO-data exchange protocol (DEP) RF interface and NFC-DEP RF interface. In another configuration, the NFC device 102 and the remote NFC device 104 may establish an NFC-DEP RF protocol based communication link with link layer connections defined through a logical link control protocol (LLCP). In still another configuration, the NFC device 102 and the remote NFC device 104 may be operable to be connected to an access network and/or core network (e.g., a CDMA network, a GPRS network, a UMTS network, and other types of wireline and wireless communication networks).

The NFC device 102 may operate in either an initiator mode or a target mode. When in the initiator mode, the NFC device 102 may be referred to as an initiator NFC device (and also as a poller, polling device, proximity coupling device (PCD), reader or initiator). When in target mode, the NFC device 102 may be referred to as a target NFC device (and also as a listener, listening device, proximity integrated circuit card (PICC) or target).

An initiator NFC device may generate an electromagnetic field to which a target NFC device may be coupled. For example, in the case of NFC, the direction for the data flow in the NFC standards is characterized by having an initiator NFC device provide the electromagnetic field.

A target NFC device may communicate with the initiator NFC device by modulating the electromagnetic field. In one configuration, the target NFC device may modulate the electromagnetic field using passive load modulation (PLM). In another configuration, the target NFC device may generate the modulation content using active load modulation (ALM). For example, the target NFC device may regenerate the signal received from the initiator NFC device. The target NFC device may then retransmit a phase-synchronized modulated signal to the first device. With ALM, the resulting level of the modulation received at the initiator NFC device can be higher than the modulation level produced by a traditional passive (e.g., resistive) load modulation.

While in initiator mode, the initiator NFC device may poll for nearby NFC devices. A target NFC device may begin to listen when it comes within a few centimeters of the initiator NFC device. For example, a user may place a target NFC device in the vicinity of the initiator NFC device to initiate a payment transaction. The initiator NFC device will then communicate with the target NFC device in order to determine which signaling technologies can be used.

In NFC, there is a trade-off between power transfer and data rate 134. Under some circumstances, in order to transmit sufficient power to activate a passive device (e.g., a tag) the data rate 134 has to be maintained low. However, different NFC applications may specify tags with different memory requirements, power requirements and data rates 134. To be compliant, global NFC standards specify that an NFC device in an initiator mode be able to handle multiple data rates 134 for different RF modulation schemes.

As antenna 106 sizes reduce, the power/data rate 134 trade-off becomes even more important. In some approaches, the end design of an NFC device 102 is optimized for the highest data rate 134 in order to be compliant and ensure interoperability with tags used for various applications. However, in doing so, the power transfer, and hence the performance, is sacrificed. Therefore, an NFC device 102 faces conflicting goals.

One goal is providing adequate power for a remote NFC device 104 to activate. Another goal is to send commands (e.g., signals) in a clear form. The waveform transmitted by an NFC device 102 should not have over-shoots or under-shoots. The NFC standards specify timing criteria to be met for a given data rate 134 to be compliant with the different NFC tags and systems. As the data rate 134 increases, the timing becomes stricter and stricter, to ensure that the transmitted information is properly decoded.

In communication systems, a quality factor (also referred to as Q or Q factor) describes how under-damped a resonant circuit is. The quality factor of a resonant circuit is directly related to the time constant of the resonant circuitry. The quality factor may be expressed according to Equation (1).

$$\text{Quality Factor} = \text{Resonant Frequency (radians/sec)} \cdot \text{Time Constant} \quad (1)$$

The quality factor is directly proportional to the power delivered in a resonant power transfer scheme. A higher quality factor indicates a lower rate of energy loss relative to the stored energy or the resonant circuit. When an impedance of the resonant circuit is low, but not necessarily closed, the quality factor improves. When an impedance of the resonant circuit is high, but not necessarily open, the quality factor goes down.

To be compliant with the timing specifications, an NFC device 102 may put the quality factor of its tuning circuit to a lower value. This restricts the power transfer from the NFC device 102 to the remote NFC device 104 (e.g., the tag end). The power transfer is proportional to the quality factor of the tuning.

In the NFC device 102, a matching network 112 may form a resonant circuit. When a resonant circuit is connected to other components (e.g., the transmitter 116 or the reactive load 108), the total losses of the resonant circuit are combined with the source and load resistances. The total quality factor of the resonant circuit (with source and load resistances) is the loaded quality factor.

In the NFC device 102, the matching network 112 is coupled to a transmitter 116 and a reactive load 108. The transmitter 116 provides a source impedance 118 (also referred to as a transmitter impedance) to the matching network 112. The reactive load 108 provides a reactive load impedance 110 to the matching network 112. Furthermore, the matching network 112 has its own matching network impedance 114. It should be noted that the reactive load 108 may be an inductively coupled target load seen by the transmitter 116. The reactive load 108 includes the antenna 106, the losses within the antenna 106 and the mutually coupled load. The reactive load may represent losses between the matching network 112 and the antenna 106 due to the reactive load impedance 110. Therefore, the reactive load 108 is not the remote NFC device 104 load.

As the loaded quality factor of the matching network 112 increases, the power transfer from the NFC device 102 to the remote NFC device 104 increases. But as the data rates 134 go up, the same quality factor may not be used. For example, a data rate 134 of 106 kilobits per second (kbps) may need a quality factor of 16 to meet the NFC timing, but for 848 kbps, a quality factor of 8 is used. This drop in quality factor may reduce the power transmitted. As smaller and smaller antennas 106 are being used in NFC devices 102, this trade-off becomes significant. With smaller antennas 106, the coupling factor is low, so the power transfer is reduced. With the lower coupling factors with smaller antennas, it may be undesirable to sacrifice the quality factor to be compliant with a high data rate 134.

The systems and methods described herein reduce this power/data rate 134 trade-off to allow small antennas 106 to be compliant with global standards. The described systems and methods may increase the performance but also maintain compliance and interoperability.

A quality factor switching module 120 may provide a control scheme for an NFC device 102 to operate at conditions advantageous to both high power transfer and high data rates 134 at the same time. In one configuration, the quality factor switching module 120 may be incorporated in an integrated circuit. In one aspect, the quality factor switching module 120 may perform a form of a load modulation scheme. Quality factor switching may be performed in the initiator mode and target mode. The control scheme could be used with any resonant matching network 112. For example, in NFC, the matching network 112 is designed for a given antenna 106 to match the source impedance 118 of transmitter 116.

In some approaches, the source impedance 118 is fixed during the period of communication with the remote NFC device 104 (e.g., tag or a card). It is typical for NFC/radio-frequency identification (RFID) communication standards to employ some form of amplitude modulation (AM). Therefore, AM parameters (e.g., the rise time, fall time and the modulation index of the envelope) are specified by the standards. These AM parameters are specified for a given data rate 134. In these approaches, the AM signal is modulated by turning the transmitter 116 on and off.

The transmitter 116 may have different transmit power states. Each transmit power state is associated with a certain source impedance 118. In one configuration, the power states may correspond to an AM high state 122 and an AM low state 128. The AM high state 122 may have a first power level 127 and the AM low state 128 may have a second power level 133.

The transmitter 116 may transmit more power during the AM high state 122 than during the AM low state 128. Therefore, the first power level 127 may be greater than the second power level 133. During the AM low state 128, the transmitter 116 may be modeled as a voltage source with a series impedance. In this case, the voltage source produces zero voltage. These states, and hence, the source impedance 118 may be controlled without any change in the matching network 112 circuitry to allow for high power transfer and high data rates 134.

The quality factor switching module 120 may apply a high loaded quality factor 124 to the matching network 112 of an active transmitter 116 during an AM high state 122. The quality factor switching module 120 may switch to a low loaded quality factor 130 for the matching network 112 during an AM low state 128.

The active transmitter 116 transfers power and can be used in both an initiator mode and a target mode. For example, when the NFC device 102 is operating as an initiator NFC device, the active transmitter 116 can generate the electromagnetic field with which the remote NFC device 104 couples. Furthermore, when the NFC device 102 is operating as a target NFC device, the active transmitter 116 can transfer power during ALM.

The high loaded quality factor 124 is greater than the low loaded quality factor 130. The loaded quality factor may be changed by changing the source impedance 118, the reactive load impedance 110 or a combination of both the source impedance 118 and the reactive load impedance 110.

The components of the matching network 112 may be fixed. Therefore, components of the matching network 112 are fixed for different data rates 134 and at least one of a source (e.g., transmitter 116) quality factor and a reactive load 108 quality factor switch between the AM high state 122 and the AM low state 128.

The combination of the source impedance 118 and the reactive load impedance 110 that produces the high loaded quality factor 124 may be less than the combination of the source impedance 118 and the reactive load impedance 110 that produces the low loaded quality factor 130. For the high loaded quality factor 124, there may be less mismatch between the source impedance 118 and the matching network impedance 114 than the low loaded quality factor 130. In other words, the difference between the matching network impedance 114 and the impedance combination (e.g., source impedance 118 and/or reactive load impedance 110) that produces the high loaded quality factor 124 may be less than the difference between the matching network impedance 114 and the impedance combination that produces the low loaded quality factor 130.

It should be noted that the matching network 112 may have two interfaces: 1) the source (e.g., transmitter 116)/matching network interface and 2) the matching network/antenna (referred to as reactive load 108) interface. A change in loaded quality factor is achieved through a change in the impedance match at the source interface or antenna interface of the matching network 112. The high loaded quality factor 124 may have a matched state at the two interfaces or a mismatched state. For the high loaded quality factor 124, the source impedance 118 is lower than the total impedance presented at the transmitter 116 by the matching network 112 and antenna (e.g., reactive load 108) combination. The low loaded quality factor 130 may be achieved by a mismatched state at either the source interface or the antenna interface. In the case of a mismatched state at the source causing a low loaded quality factor 130, the source impedance 118 is higher (potentially much higher) than the impedance presented by the matching network and antenna combination.

The quality factor switching module 120 may can change the transmit impedance between the AM high state 122 and the AM low state 128. When the NFC device 102 is in an AM high state 122, the NFC device 102 may transmit power during that period. Therefore, it is beneficial to maintain a high loaded quality factor 124 during the AM high state 122 to transmit more power. When the NFC device 102 is in an AM low state 128, the NFC device 102 may be put in a state where the loaded quality factor is low. The low laded quality factor 130 may produce fast fall times without increasing the rise time of the envelope. This may achieve an average quality factor that is lower, but does not sacrifice quality factor when NFC device 102 is transmitting power.

In one configuration, the quality factor switching module 120 may determine a first impedance value 126 to apply during the AM high state 122 to produce the high loaded quality factor 124. The first impedance value 126 may indicate a source impedance 118, a reactive load impedance 110 or a combination of both.

The quality factor switching module 120 may determine a second impedance value 132 to apply during the AM low state 128 to produce the low loaded quality factor 130. The second impedance value 132 may indicate a source impedance 118, a reactive load impedance 110 or a combination of both.

The quality factor switching module 120 may send a first control signal 136a to change the source impedance 118. The quality factor switching module 120 may send a second control signal 136b to change the reactive load impedance 110. It should be noted that while two control signals 136 are illustrated in FIG. 1, any number or combination of control signals 136 may be implemented to adjust the source impedance 118, the reactive load impedance 110 or a combination of both impedances 110, 118.

In one configuration, one or more components of the NFC device 102 (e.g., matching network 112, transmitter 116 and reactive load 108) may be implemented in an integrated circuit. In this configuration, the reactive load 112 may be changed from within the integrated circuit. The integrated circuit may have two pins connected to the antenna 106 for receive purposes. By switching across these pins, a parallel combination of capacitor banks and a suitable damping resistor may change the reactive load impedance 110, depending on the antenna 106 losses. When only a capacitor bank is used, the desired change in reactive load impedance 110 may be achieved through detuning.

Applying the high loaded quality factor 124 (e.g., setting the source impedance 118 to equal the matching network impedance 114) creates conditions for high power transfer. By applying the low loaded quality factor 130 (e.g., setting the source impedance 118 to a mismatch state with respect to the matching network impedance 114) creates fast fall times without increasing the rise time of the envelope.

In one approach, the high loaded quality factor 124 and the low loaded quality factor 130 may be produced by changing the source impedance 118 with respect to the matching network impedance 114. In this approach, the quality factor switching module 120 may not switch the reactive load impedance 110. The quality factor switching module 120 may produce the high loaded quality factor 124 by setting the source impedance 118 equal to the matching network impedance 114. The quality factor switching module 120 may set the source impedance 118 to a mismatch state with respect to the matching network impedance 114 to produce the low loaded quality factor 130.

In another approach, the high loaded quality factor 124 and the low loaded quality factor 130 may be produced by changing the reactive load impedance 110 with respect to the matching network impedance 114. In this approach, the quality factor switching module 120 may not switch the source impedance 118. The quality factor switching module 120 may switch the quality factor of a reactive load 108 between the AM high state 122 and the AM low state 128. This may be accomplished by switching the reactive load impedance 110.

In one implementation, the quality factor switching module 120 may switch the quality factor of the reactive load 108 without switching a source quality factor during low-power transmitter conditions. For example, when the transmitter 116 is a high-output impedance transmitter, it may be beneficial to adjust the reactive load impedance 110 without changing the source impedance 118. Therefore, the quality factor switching module 120 may produce the high loaded quality factor 124 and the low loaded quality factor 130 by changing the reactive load impedance 110 without switching the source impedance 118.

In yet another approach, the quality factor switching module 120 may switch both the source (e.g., transmitter 116) quality factor and the reactive load 108 quality factor. In this approach, switching the quality factor of the reactive load 108 may be done in combination with switching a source quality factor. The quality factor switching module 120 may switch both the source impedance 118 and the reactive load impedance 110 to produce the high loaded quality factor 124 and the low loaded quality factor 130.

The NFC device 102 may perform quality factor switching based on data rates 134. In one configuration, the quality factor switching module 120 may select different impedances for the high loaded quality factor 124 and the low loaded quality factor 130 based on different data rates 134. In another configuration, the quality factor switching module 120 may select an impedance for the high loaded quality factor 124 and an impedance for the low loaded quality factor 130 based on a highest data rate 134. The quality factor switching module 120 may then apply the selected impedances to other (e.g., lower) data rates 134. In either configuration, the different states of impedance may be selected to be compliant with NFC specifications.

The described systems and methods provide benefits for an NFC device 102 operating in both initiator and target modes. These benefits include increased power transfer, which may improve the performance of small antennas 106. Furthermore, the described systems and methods provide for faster fall times of the waveform without overshooting.

Additionally, as described, the quality factor switching may be accomplished by controlling the transmitter 116 or the reactive load 108. Therefore, the matching network 112 components may be fixed. Therefore, one matching network 112 configuration may be set for all data rates 134 and the matching network 112 does not need to be reconfigured for different data rates 134, thus simplifying the design of the matching network 112.

In the case of target mode operation, the NFC device 102 may use an ALM scheme for the target (e.g., tag/card) mode. During ALM, the NFC device 102 actively transfers power and the remote NFC device 104 sees the signal as a response. Since the NFC device 102 is transferring power, the power match is important. Additionally, switching quality factors may provide benefits during passive load modulation (PLM) by providing a higher modulation index for high data rates 134 and faster fall times. The described systems and methods improve the performance in the target mode by providing an efficient means (e.g., less battery power) to generate a high modulation index. This may allow operation at farther distances and may also reduce the antenna 106 size requirements.

The described systems and methods may provide additional benefits for benefits in target mode for ALM. The common practice in ALM implementation is to design a wideband matching network 112 with a low loaded quality factor 130. This has a benefit in the improvement of the modulation index due to fast fall/rise time of the carrier when transitioning from AM high state to low state or vice versa. However, to achieve this wideband matching network 112 design, multiple segments of inductors and capacitors are cascaded to the antenna 106. This results in additional components and space requirements. Also, the traditional approach of static wideband matching network 112 design (with a low loaded quality factor 130) reduces the ALM receiver sensitivity by decreasing the initiator signal and, hence, diminishing the signal to noise ratio seen by the ALM receiver. This is particularly true for the small antennas 106.

The described systems and methods provide an average low loaded quality factor 130 suitable for ALM without needing the additional matching network 112 segments and space on a printed circuit board, while at the same time increasing the performance with small antennas 106.

Figure 2:
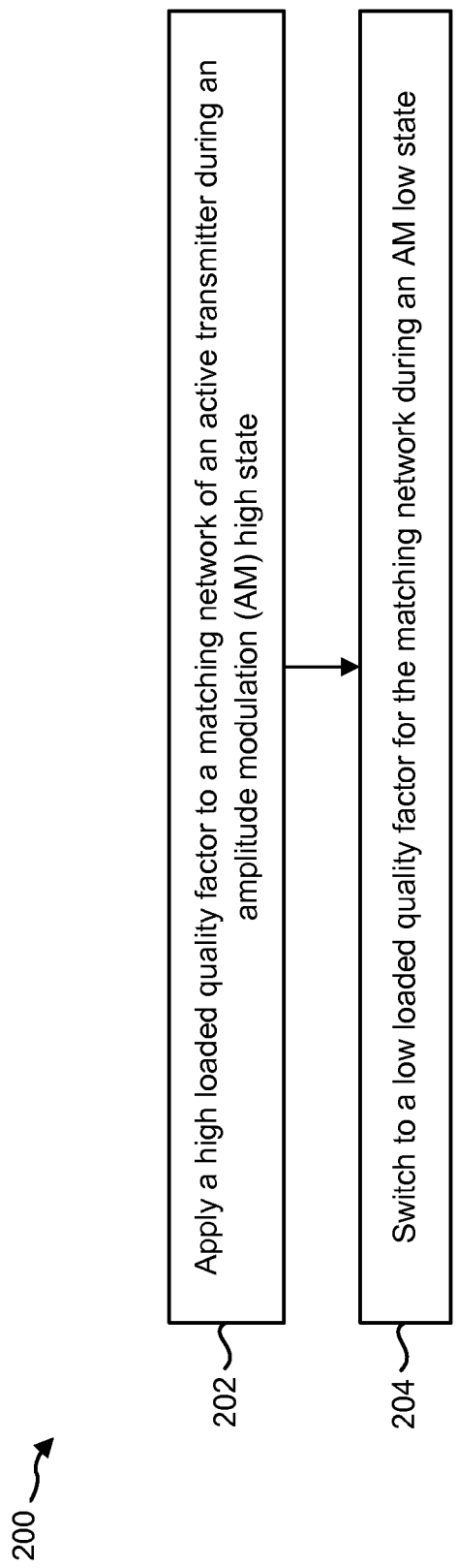
FIG. 2 is a flow diagram illustrating a method for switching quality factors during inductively coupled communications.

FIG. 2 is a flow diagram illustrating a method 200 for switching quality factors during inductively coupled communications. The method 200 may be implemented by an NFC device 102. In the case of near field communication (NFC), the NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may apply 202 a high loaded quality factor 124 to the matching network 112 of the active transmitter 116 during an AM high state 122. The active transmitter 116 transfers power and can be used in both an initiator mode and a target mode. For example, when the NFC device 102 is operating as an initiator NFC device, the active transmitter 116 can generate the electromagnetic field with which the remote NFC device 104 couples. Furthermore, when the NFC device 102 is operating as a target NFC device, the active transmitter 116 can transfer power during ALM. The transmitter 116 may transmit more power during the AM high state 122 than the AM low state 128.

The NFC device 102 may apply 202 the high loaded quality factor 124 by setting at least one of a source (e.g., transmitter 116) quality factor and a reactive load 108 quality factor for the AM high state 122. This may be accomplished by adjusting one or more of a source impedance 118 and a reactive load impedance 110. Applying the high loaded quality factor 124 (e.g., setting the source impedance 118 or reactive load impedance 110 to be approximately equal to the matching network impedance 114) creates conditions for high power transfer.

The NFC device 102 may switch 204 to a low loaded quality factor 130 for the matching network 112 during an AM low state 128. The NFC device 102 may apply the low loaded quality factor 130 by setting at least one of the source quality factor and the reactive load 108 quality factor for the AM low state 128. By applying the low loaded quality factor 130 (e.g., setting the source impedance 118 or reactive load impedance 110 to a mismatch state with respect to the matching network impedance 114) creates fast fall times without increasing the rise time of the envelope.

The high loaded quality factor 124 is greater than the low loaded quality factor 130. The combination of the source impedance 118 and the reactive load impedance 110 that produces the high loaded quality factor 124 may be less than the combination of the source impedance 118 and the reactive load impedance 110 that produces the low loaded quality factor 130.

In one approach, the high loaded quality factor 124 and the low loaded quality factor 130 may be produced by changing the source impedance 118 with respect to the matching network impedance 114, as described in connection with FIG. 6. In another approach, the high loaded quality factor 124 and the low loaded quality factor 130 may be produced by changing the reactive load impedance 110 with respect to the matching network impedance 114, as described in connection with FIG. 7. In yet another approach, the NFC device 102 may switch both the source impedance 118 and the reactive load impedance 110 to produce the high loaded quality factor 124 and the low loaded quality factor 130, as described in connection with FIG. 8.

Figure 3:
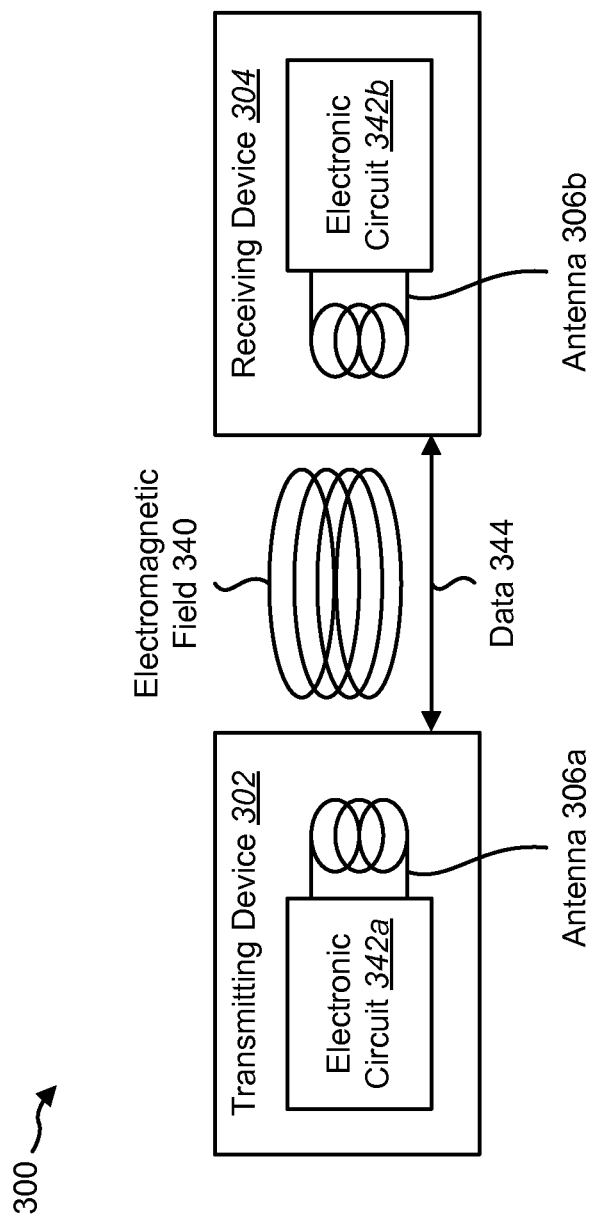
FIG. 3 is a block diagram illustrating one configuration of inductively coupled communication in a wireless communication system.

FIG. 3 is a block diagram illustrating one configuration of inductively coupled communication in a wireless communication system 300. A transmitting device 302 and a receiving device 304 may operate according to near field communication (NFC) protocols. The transmitting device 302 may be implemented according to the initiator NFC device 102 described in connection with FIG. 1. The receiving device 304 may be a remote NFC device 104. Each device 302, 304 may include an antenna 306a-b connected to an electronic circuit 342a-b. During operation, the combination of two NFC devices (i.e., the transmitting device 302 and receiving device 304) may behave like a transformer.

NFC is an inductive coupling communication technology. The two NFC-capable devices 302, 304 may be separated by a distance. An alternating current may pass through a primary coil (i.e., the transmitting device antenna 306a) and create an electromagnetic field 340 (which may also be referred to as a radio frequency (RF) field or radiated field). The electromagnetic field 340 may induce a current in the secondary coil (i.e., the receiving device antenna 306b). The receiving device 304 may use the electromagnetic field 340 transmitted by the transmitting device 302 to power itself.

The configuration and tuning of both antennas 306a-b may determine the coupling efficiency from one device to the other device. During certain NFC transactions, the transmitting device 302 may function as an initiator and the receiving device 304 may function as a target, which are roles defined in the NFC standards. During other NFC transactions, the transmitting device 302 may function as a target and the receiving device 304 may function as an initiator.

The NFC transmitter of one device and the NFC receiver of the other device may be configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the near field of the radiated field.

An NFC device may include an NFC loop antenna 306. The NFC loop antenna 306 may provide a means for energy transmission and reception. As stated, an efficient energy transfer may occur by coupling a large portion of the energy in the near field of a transmitting antenna 306 to a receiving antenna 306 rather than propagating most of the energy in an electromagnetic wave to the far field.

An NFC-capable device may obtain sufficient data 344 to allow for communications to be established. One form of communications that may be established is an international standards organization data exchange protocol (ISO-DEP) communication link. Another form of communications that may be established is NFC-DEP. Communications between the NFC devices may be enabled over a variety of NFC radio frequency (RF) technologies, including but not limited to, NFC-A, NFC-B, NFC-F etc.

Figure 4:
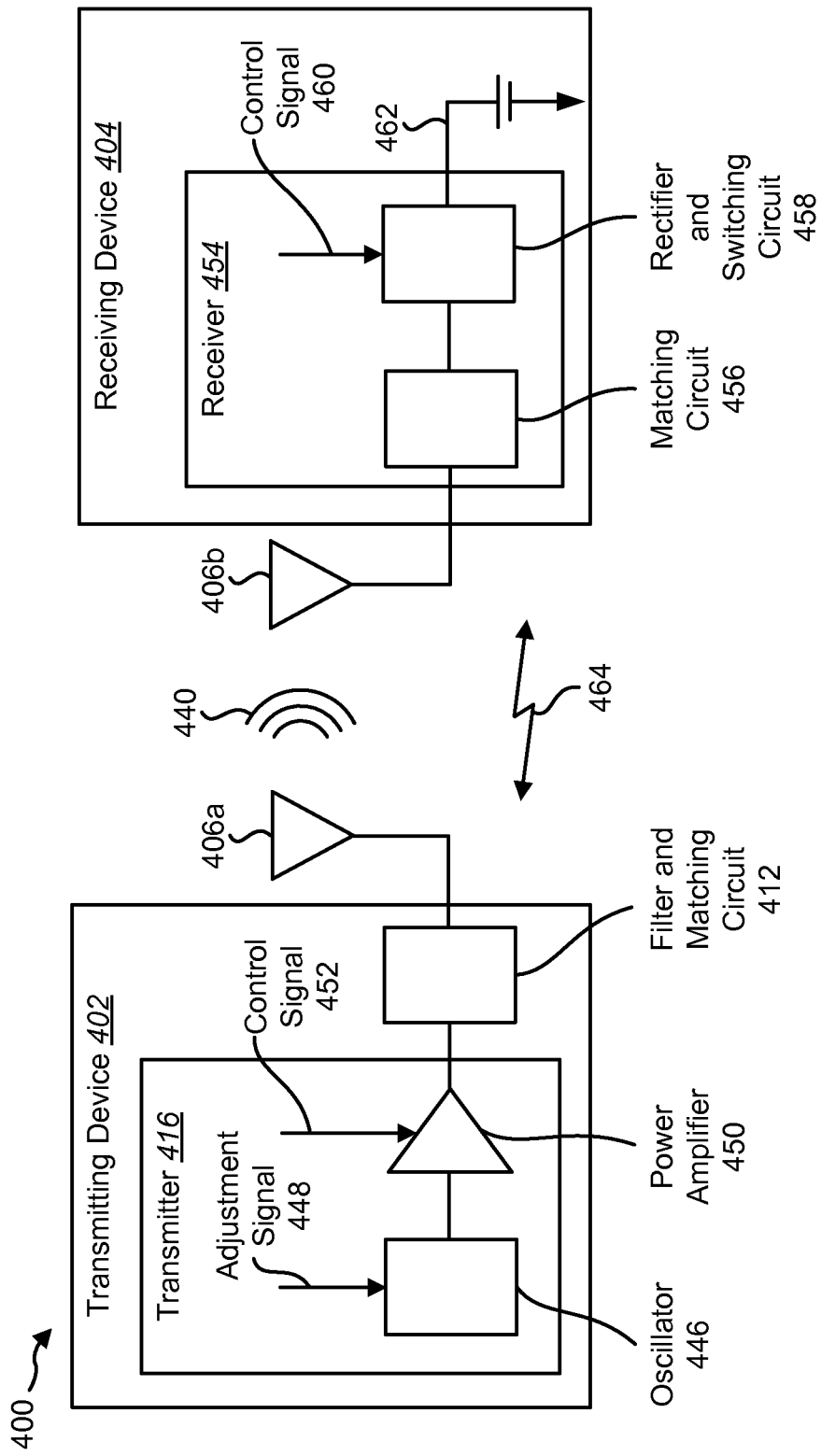
FIG. 4 shows a one configuration of simplified schematic diagram of a near field wireless communication system.

FIG. 4 shows a one configuration of simplified schematic diagram of a near field wireless communication system 400. A transmitting device 402 may include a transmitter 416, a filter and matching circuit 412 and a transmit antenna 406a. The transmitter 416 includes an oscillator 446 and a power amplifier 450. The oscillator 446 is configured to generate a signal at a desired frequency, which may be adjusted in response to an adjustment signal 448. The oscillator 446 signal may be amplified by the power amplifier 450 with an amplification amount responsive to a control signal 452. The filter and matching circuit 412 may be included to filter out harmonics or other unwanted frequencies and match the impedance of the transmitter 416 to the transmit antenna 406a. The transmit antenna 406a may transmit a radiated field 440 (also referred to as an electromagnetic field).

A receiving device 404 may include a receiver 454 and a receive antenna 406b. The receiver 454 may include a matching circuit 456 and a rectifier and switching circuit 458 to generate a DC power output 462 to charge a battery or power a device coupled to the receiver (not shown). The matching circuit 456 may be included to match the impedance of the receiver 454 to the receive antenna 406b. The rectifier switching circuit 458 may be adjusted by a control signal 460. The receiver 454 and transmitter 416 may communicate on a separate communication channel 464 (e.g., Bluetooth, zigbee, cellular, etc.).

Figure 5:
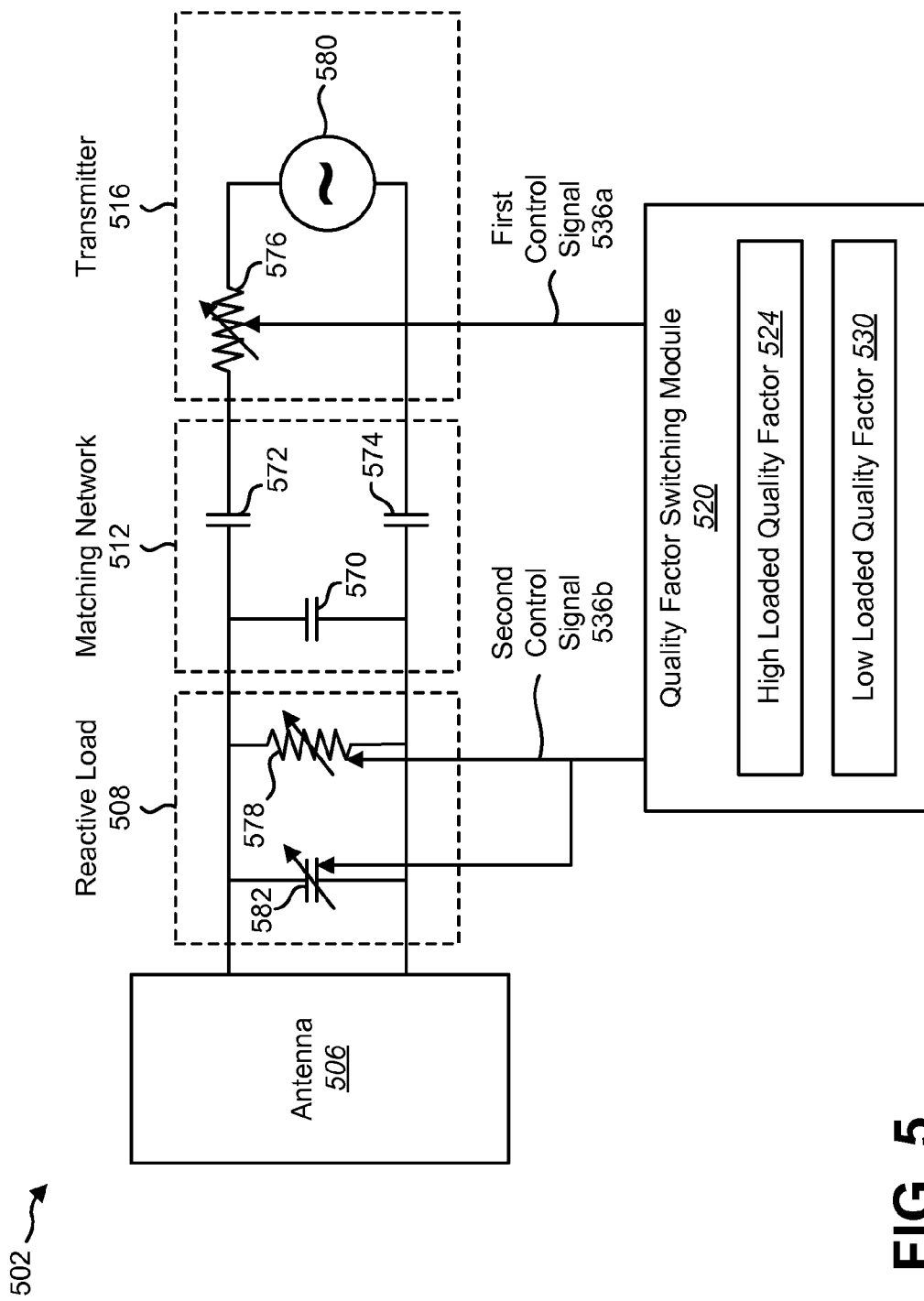
FIG. 5 is a block diagram illustrating a detailed configuration of a NFC device in which switching quality factors during inductively coupled communications may be implemented.

FIG. 5 is a block diagram illustrating a detailed configuration of a NFC device 502 in which switching quality factors during inductively coupled communications may be implemented. The NFC device 502 may communicate with a remote NFC device 104 (not shown) using inductively coupled communication. In one configuration, the inductively coupled communication may be near field communication (NFC).

The NFC device 502 includes a transmitter 516 that is coupled to matching network 512. An antenna 506 is also coupled to the matching network 512. In the configuration shown in FIG. 5, a reactive load 508 is modeled as a variable resistor 578 and a variable capacitor 582. The transmitter 516 is modeled as a voltage source 580 and a variable resistor 576 in series.

The matching network 512 may include series and parallel capacitors (Cs-Cp). For example, capacitor 572 and capacitor 574 may be coupled in series with the antenna 506. A capacitor 570 may be coupled in parallel with the antenna 506. The matching network 512 may match the impedance of the antenna 506 to the transmitter 516 impedance.

A quality factor switching module 520 may switch the loaded quality factor of the matching network 512 between an AM high state 122 and an AM low state 128. During an AM high state 122, the quality factor switching module 520 may apply a high loaded quality factor 524. During an AM low state 128, the quality factor switching module 520 may apply a low loaded quality factor 530.

To change the loaded quality factor, the quality factor switching module 520 may adjust the impedance of the transmitter 516, the reactive load 508 or both. When an impedance is low, the loaded quality factor improves, which may allow for increased power transmission. When an impedance is higher, but not necessarily open, the quality factor goes down, which may improve signal response for high data rates 134.

To regulate impedance, the NFC device 502 may use variable resistance. In one configuration, the quality factor switching module 520 may send a first control signal 536a to the resistor 576 to adjust the impedance (e.g., resistance) of the transmitter 516. The quality factor switching module 520 may send a second control signal 536b to the resistor 578 and/or capacitor 582 to adjust the impedance (e.g., resistance and/or capacitance) of the reactive load 508. It should be noted that while a single control signal 536b is provided to both the resistor 578 and capacitor 582 of the reactive load 508, in another implementation, separate control signals 536 may be provided to each of the resistor 578 and capacitor 582.

By toggling the quality factor within an AM modulation cycle, the NFC device 502 may achieve a higher modulation index while maintaining a higher data rate 134.

Figure 6:
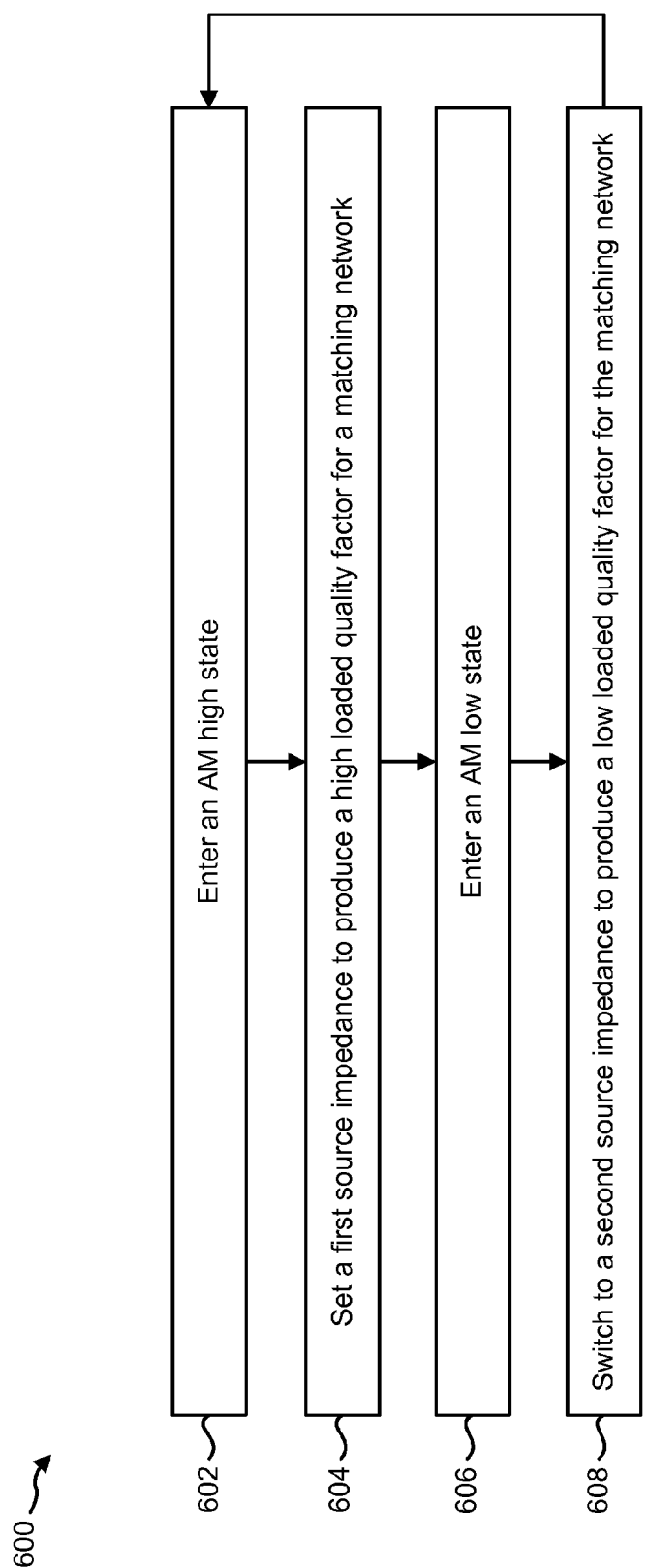
FIG. 6 is a flow diagram illustrating a detailed configuration of a method for switching quality factors by changing a source impedance.

FIG. 6 is a flow diagram illustrating a detailed configuration of a method 600 for switching quality factors by changing a source impedance 118. The method 600 may be implemented by an NFC device 102. The NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may enter 602 an AM high state 122. During NFC communication, the NFC device 102 may perform AM modulation. The NFC device 102 may switch between an AM high state 122 and an AM low state 128 during AM modulation. The transmitter 116 may transmit more power during the AM high state 122 than during the AM low state 128.

The NFC device 102 may set 604 a first source impedance 118 to produce a high loaded quality factor 124 for the matching network 112. The high loaded quality factor 124 may be produced by changing the source impedance 118 with respect to the matching network impedance 114. The NFC device 102 may not switch the reactive load impedance 110. In one configuration, the NFC device 102 may produce the high loaded quality factor 124 by setting the first source impedance 118 equal to the matching network impedance 114.

The NFC device 102 may enter 606 an AM low state 128. The transmitter 116 may transmit less power during the AM low state 128 than during the AM high state 122.

The NFC device 102 may switch 608 to a second source impedance 118 to produce a low loaded quality factor 130 for the matching network 112. The second source impedance 118 may be higher than the first source impedance 118. Therefore, the low loaded quality factor 130 is less than the high loaded quality factor 124.

The NFC device 102 may continue switching the source impedance 118 between the AM high state 122 and the AM low state 128. For example, upon re-entering 602 the AM high state 122, the NFC device 102 may switch back to the high loaded quality factor 124.

It should be noted that in this method 600, the NFC device 102 may switch between the high loaded quality factor 124 and the low loaded quality factor 130 without changing the reactive load impedance 110. The components or the matching network 112 may be fixed.

Figure 7:
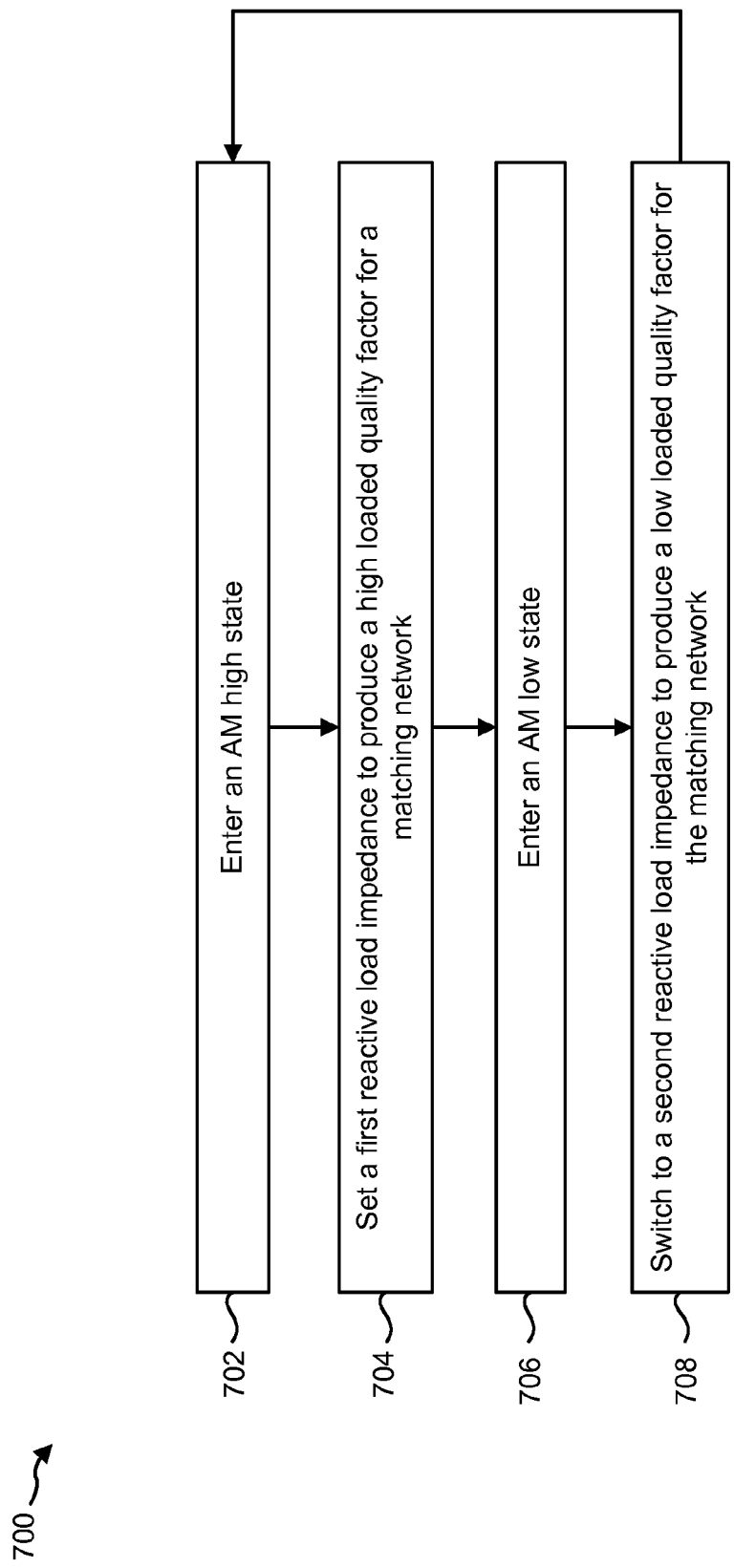
FIG. 7 is a flow diagram illustrating a detailed configuration of a method for switching quality factors by changing a reactive load impedance.

FIG. 7 is a flow diagram illustrating a detailed configuration of a method 700 for switching quality factors by changing a reactive load impedance 110. The method 700 may be implemented by an NFC device 102. The NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may enter 702 an AM high state 122. To perform AM modulation, the NFC device 102 may transmit more power during the AM high state 122 than during an AM low state 128.

The NFC device 102 may set 704 a first reactive load impedance 110 to produce a high loaded quality factor 124 for the matching network 112. The high loaded quality factor 124 may be produced by changing the reactive load impedance 110 with respect to the matching network impedance 114. In one configuration, the NFC device 102 may produce the high loaded quality factor 124 by setting the first reactive load impedance 110 equal to the matching network impedance 114.

The NFC device 102 may enter 706 an AM low state 128. The transmitter 116 may transmit less power during the AM low state 128 than during the AM high state 122.

The NFC device 102 may switch 708 to a second reactive load impedance 110 to produce a low loaded quality factor 130 for the matching network 112. The second reactive load impedance 110 may be higher than the first reactive load impedance 110. Therefore, the low loaded quality factor 130 is less than the high loaded quality factor 124.

The NFC device 102 may continue switching the reactive load impedance 110 between the AM high state 122 and the AM low state 128. For example, upon re-entering 702 the AM high state 122, the NFC device 102 may switch back to the high loaded quality factor 124.

It should be noted that in this method 700, the NFC device 102 may switch between the high loaded quality factor 124 and the low loaded quality factor 130 without changing the source impedance 118. The components or the matching network 112 may be fixed.

Figure 8:
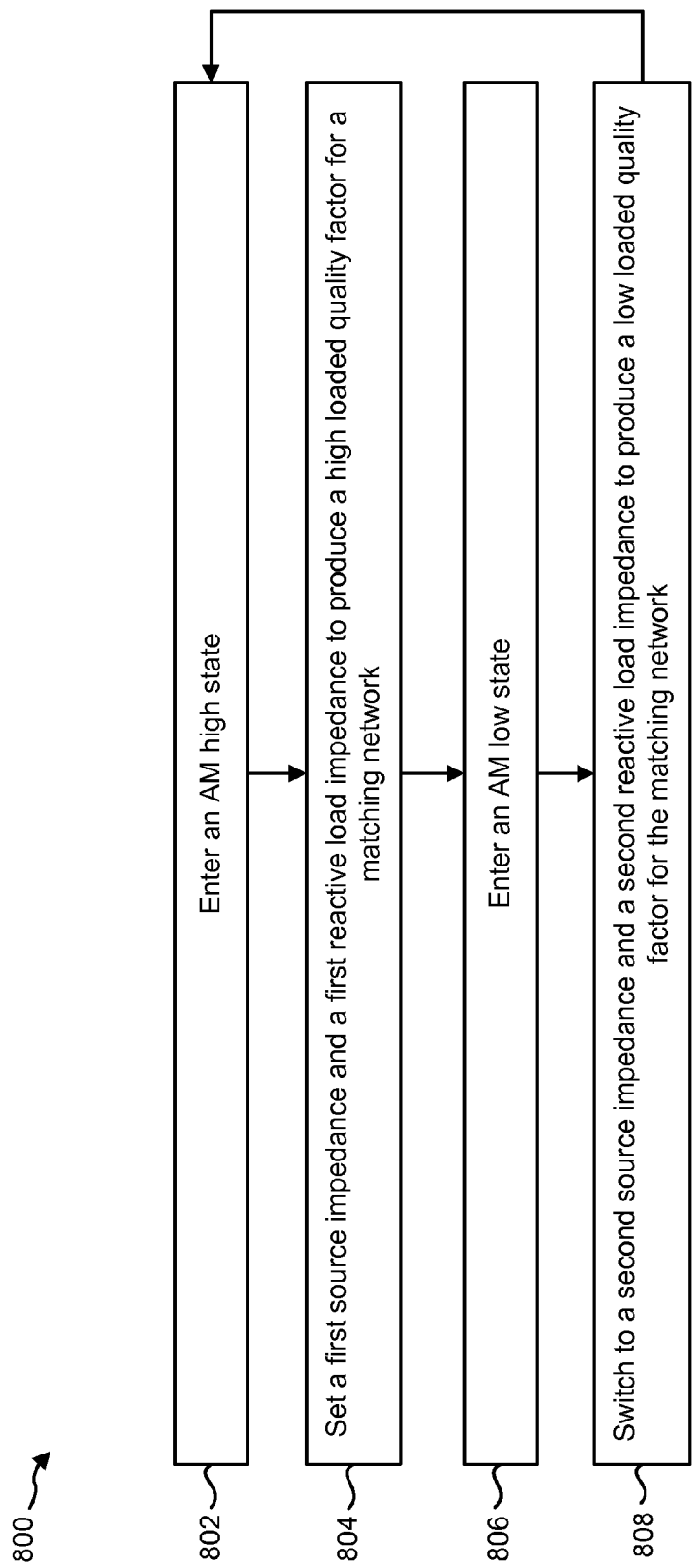
FIG. 8 is a flow diagram illustrating a detailed configuration of a method for switching quality factors by changing a source impedance and a reactive load impedance.

FIG. 8 is a flow diagram illustrating a detailed configuration of a method 800 for switching quality factors by changing a source impedance 118 and a reactive load impedance 110. The method 800 may be implemented by an NFC device 102. The NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may enter 802 an AM high state 122. To perform AM modulation, the NFC device 102 may transmit more power during the AM high state 122 than during an AM low state 128.

The NFC device 102 may set 804 a first source impedance 118 and a first reactive load impedance 110 to produce a high loaded quality factor 124 for the matching network 112. The high loaded quality factor 124 may be produced by changing both the source impedance 118 and the reactive load impedance 110 with respect to the matching network impedance 114. In one configuration, the NFC device 102 may produce the high loaded quality factor 124 by setting at least one of the first source impedance 118 and the first reactive load impedance 110 equal to the matching network impedance 114.

The NFC device 102 may enter 806 an AM low state 128. The transmitter 116 may transmit less power during the AM low state 128 than during the AM high state 122.

The NFC device 102 may switch 808 to a second source impedance 118 and a second reactive load impedance 110 to produce a low loaded quality factor 130 for the matching network 112. The combination of the second source impedance 118 and the second reactive load impedance 110 may be higher than the combination of the first source impedance 118 and the first reactive load impedance 110. Therefore, the low loaded quality factor 130 is less than the high loaded quality factor 124.

The NFC device 102 may continue switching the source impedance 118 and the reactive load impedance 110 between the AM high state 122 and the AM low state 128. For example, upon re-entering 802 the AM high state 122, the NFC device 102 may switch back to the high loaded quality factor 124.

It should be noted that in this method 800, the NFC device 102 may switch between the high loaded quality factor 124 and the low loaded quality factor 130 by changing both the source impedance 118 and the reactive load impedance 110. The components or the matching network 112 may be fixed.

Figure 9:
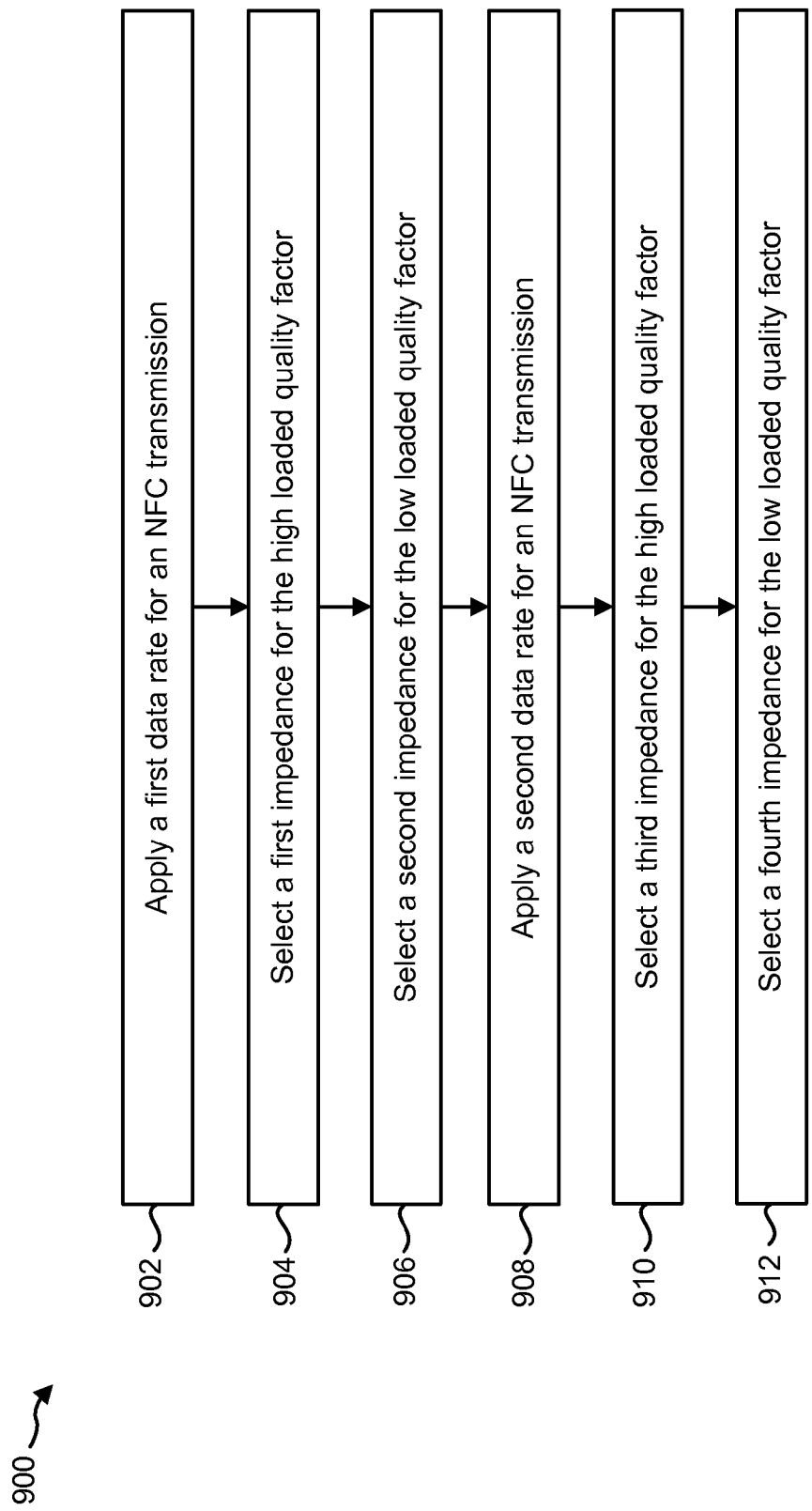
FIG. 9 is a flow diagram illustrating one configuration of a method for switching quality factors based on data rates.

FIG. 9 is a flow diagram illustrating one configuration of a method 900 for switching quality factors based on data rates 134. The method 900 may be implemented by an NFC device 102. In the case of near field communication (NFC), the NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may perform quality factor switching based on data rates 134. In one configuration, the NFC device 102 may select different impedances for the high loaded quality factor 124 and the low loaded quality factor 130 based on different data rates 134.

The NFC device 102 may apply 902 a first data rate 134 for an NFC transmission. For example, the first data rate 134 may be 848 kbps.

The NFC device 102 may select 904 a first impedance for the high loaded quality factor 124. The first impedance may include impedance values for a source impedance 118, a reactive load impedance 110 or a combination of both.

The NFC device 102 may select 906 a second impedance for the low loaded quality factor 130. The second impedance may include impedance values for a source impedance 118, a reactive load impedance 110 or a combination of both. The second impedance may be higher than the first impedance. Therefore, the high loaded quality factor 124 for the first data rate 134 may be greater than the low loaded quality factor 130.

The NFC device 102 may apply 908 a second data rate 134 for an NFC transmission. For example, the second data rate 134 may be 106 kbps.

The NFC device 102 may select 910 a third impedance for the high loaded quality factor 124. The third impedance may include impedance values for a source impedance 118, a reactive load impedance 110 or a combination of both. The third impedance may differ from or may be the same as the first impedance for the high loaded quality factor 124.

The NFC device 102 may select 912 a fourth impedance for the low loaded quality factor 130. The fourth impedance may include impedance values for a source impedance 118, a reactive load impedance 110 or a combination of both. The fourth impedance may differ from or may be the same as the second impedance for the low loaded quality factor 130. The fourth impedance may be higher than the third impedance. Therefore, the high loaded quality factor 124 for the second data rate 134 may be greater than the low loaded quality factor 130 for the second data rate 134.

Figure 10:
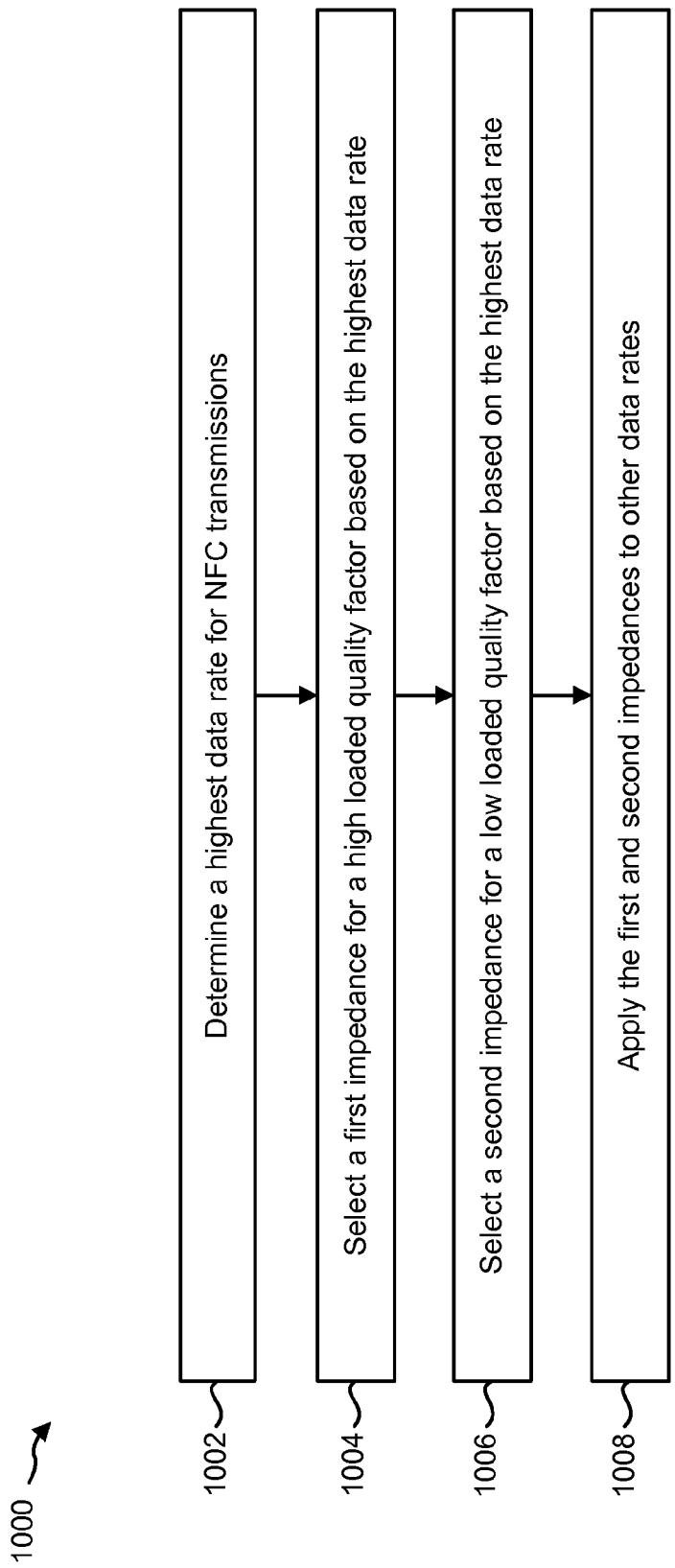
FIG. 10 is a flow diagram illustrating another configuration of a method for switching quality factors based on data rates.

FIG. 10 is a flow diagram illustrating another configuration of a method 1000 for switching quality factors based on data rates 134. The method 1000 may be implemented by an NFC device 102. In the case of near field communication (NFC), the NFC device 102 may be an initiator NFC device or a target NFC device that may send a signal to a remote NFC device 104. The NFC device 102 may include a transmitter 116 that is coupled to a matching network 112. The matching network 112 may be coupled to a reactive load 108 and antenna 106.

The NFC device 102 may perform quality factor switching based on data rates 134. In one configuration, the NFC device 102 may select different impedances for the high loaded quality factor 124 and the low loaded quality factor 130 based on a highest data rate 134.

The NFC device 102 may determine 1002 a highest data rate 134 for NFC transmissions. For example, the highest data rate 134 for NFC transmissions may be 848 kbps.

The NFC device 102 may select 1004 a first impedance for the high loaded quality factor 124 based on the highest data rate 134. The first impedance may include impedance values for a source impedance 118, a reactive load impedance 110 or a combination of both.

The NFC device 102 may select 1006 a second impedance for the low loaded quality factor 130. The second impedance may include impedance values for a source impedance 118, a reactive load impedance 110 or a combination of both. The second impedance may be higher than the first impedance. Therefore, the high loaded quality factor 124 may be greater than the low loaded quality factor 130.

The NFC device 102 may apply 1008 the first impedance and the second impedance to other data rates. For example, the other data rates 134 may include 106 kbps. The NFC device 102 may apply the high loaded quality factor 124 and the low loaded quality factor 130 of a highest data rate 134 to the other data rates 134. Therefore, when the NFC device 102 performs quality factor switching for any data rate 134, the NFC device 102 may use the high loaded quality factor 124 and the low loaded quality factor 130 determined for the highest data rate 134.

Figure 11:
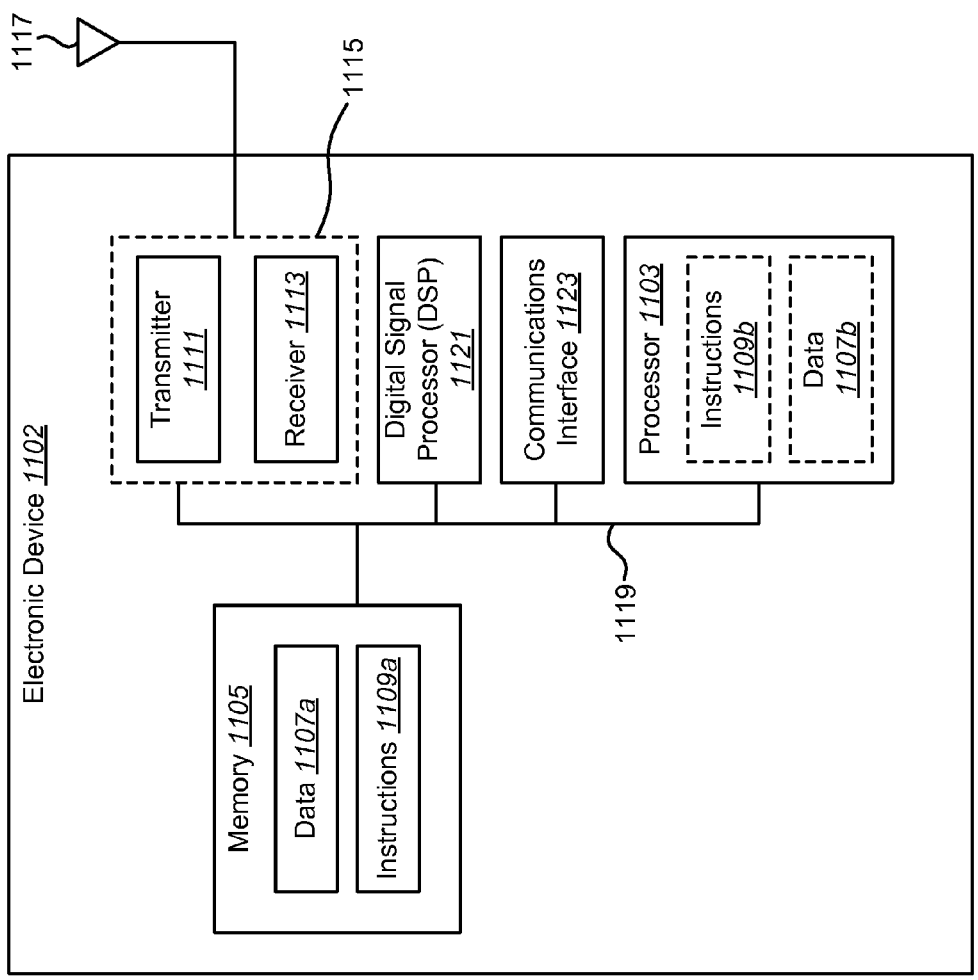
FIG. 11 illustrates various components that may be utilized in an electronic device.

FIG. 11 illustrates various components that may be utilized in an electronic device 1102. The illustrated components may be located within the same physical structure or in separate housings or structures. The electronic device 1102 described in connection with FIG. 11 may be implemented in accordance with one or more of the NFC devices 102 and 502 described herein.

The electronic device 1102 includes a processor 1103. The processor 1103 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1103 may be referred to as a central processing unit (CPU). Although just a single processor 1103 is shown in the electronic device 1102 of FIG. 11, in an alternative configuration, a combination of processors (e.g., an ARM and DSP) could be used.

The electronic device 1102 also includes memory 1105 in electronic communication with the processor (i.e., the processor can read information from and/or write information to the memory). The memory 1105 may be any electronic component capable of storing electronic information. The memory 1105 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107*a* and instructions 1109*a* may be stored in the memory 1105. The instructions 1109*a* may include one or more programs, routines, sub-routines, functions, procedures, code, etc. The instructions 1109*a* may include a single computer-readable statement or many computer-readable statements. The instructions 1109*a* may be executable by the processor 1103 to implement the methods disclosed herein. Executing the instructions 1109*a* may involve the use of the data 1107*a* that is stored in the memory 1105. When the processor 1103 executes the instructions 1109, various portions of the instructions 1109*b* may be loaded onto the processor 1103, and various pieces of data 1107*b* may be loaded onto the processor 1103.

The electronic device 1102 may also include a transmitter 1111 and a receiver 1113 to allow transmission and reception of signals to and from the electronic device 1102 via an antenna 1117. The transmitter 1111 and receiver 1113 may be collectively referred to as a transceiver 1115. The electronic device 1102 may also include (not shown) multiple transmitters, multiple antennas, multiple receivers and/or multiple transceivers.

The electronic device 1102 may include a digital signal processor (DSP) 1121. The electronic device 1102 may also include a communications interface 1123. The communications interface 1123 may allow a user to interact with the electronic device 1102.

The various components of the electronic device 1102 may be coupled together by one or more buses, which may include a power bus, a control signal bus, a status signal bus, a data bus, etc. For the sake of clarity, the various buses are illustrated in FIG. 11 as a bus system 1119.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIGS. 6-10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method, comprising:
   applying a high loaded quality factor to a matching network of an active transmitter during an amplitude modulation (AM) high state;
   switching to a low loaded quality factor for the matching network during an AM low state;
   selecting different impedances for the high loaded quality factor based on different data rates, wherein the different impedances for the high loaded quality factor include impedance values for a source impedance and a reactive load impedance; and
   selecting different impedances for the low loaded quality factor based on different data rates, wherein the different impedances for the low loaded quality factor include impedance values for the source impedance and the reactive load impedance.

2. The method of claim 1, wherein the active transmitter transfers power and can be used in both an initiator mode and a target mode.

3. The method of claim 1, wherein the high loaded quality factor and the low loaded quality factor are produced by changing the source impedance with respect to a matching network impedance.

4. The method of claim 3, wherein for the high loaded quality factor, there is less mismatch between the source impedance and the matching network impedance than the low loaded quality factor.

5. The method of claim 3, wherein the high loaded quality factor is produced by setting the source impedance equal to the matching network impedance, and wherein the low loaded quality factor is produced by setting the source impedance to a mismatch state with respect to the matching network impedance.

6. The method of claim 3, further comprising changing a quality factor of a reactive load on the matching network to produce the high loaded quality factor and the low loaded quality factor.

7. The method of claim 1, wherein components of the matching network are fixed for different data rates and at least one of a source quality factor and a reactive load quality factor switch between the AM high state and the AM low state.

8. The method of claim 1, further comprising switching a quality factor of a reactive load between the AM high state and the AM low state, wherein the reactive load is an inductively coupled target load seen by the transmitter.

9. The method of claim 8, wherein switching the quality factor of the reactive load is done in combination with switching a source quality factor.

10. The method of claim 8, further comprising switching the quality factor of the reactive load without switching a source quality factor during low-power transmitter conditions, wherein the low-power transmitter conditions comprise using a high-output impedance transmitter.

11. The method of claim 1, wherein during the AM low state, the transmitter is modeled as a voltage source with a series impedance, wherein the voltage source produces zero voltage.

12. The method of claim 1, wherein the method is performed by an initiator near field communication (NFC) device or a target NFC device.

13. The method of claim 1, further comprising:
    applying a first data rate;
    selecting a first impedance for a high loaded quality factor, wherein the first impedance includes impedance values for a source impedance and a reactive load impedance;
    selecting a second impedance for the low loaded quality factor, wherein the second impedance includes impedance values for the source impedance and the reactive load impedance;
    applying a second data rate;
    selecting a third impedance for the high loaded quality factor, wherein the third impedance includes impedance values for the source impedance and the reactive load impedance; and
    selecting a fourth impedance for the low loaded quality factor, wherein the third impedance includes impedance values for the source impedance and the reactive load impedance.

14. The method of claim 13, wherein the high loaded quality factor for the first data rate is greater than the low loaded quality factor for the first data rate.

15. The method of claim 14, wherein the second impedance is higher than the first impedance.

16. An electronic device, comprising:
    a processor;
    memory in electronic communication with the processor; and
    instructions stored in the memory, the instructions being executable by the processor to:
    apply a high loaded quality factor to a matching network of an active transmitter during an amplitude modulation (AM) high state;
    switch to a low loaded quality factor for the matching network during an AM low state;
    select different impedances for the high loaded quality factor based on different data rates, wherein the different impedances for the high loaded quality factor include impedance values for a source impedance and a reactive load impedance; and
    select different impedances for the low loaded quality factor based on different data rates, wherein the different impedances for the low loaded quality factor include impedance values for the source impedance and the reactive load impedance.

17. The electronic device of claim 16, wherein the high loaded quality factor and the low loaded quality factor are produced by changing the source impedance with respect to a matching network impedance.

18. The electronic device of claim 17, further comprising instructions executable to change a quality factor of a reactive load on the matching network to produce the high loaded quality factor and the low loaded quality factor.

19. The electronic device of claim 16, further comprising instructions executable to switch a quality factor of a reactive load between the AM high state and the AM low state, wherein the reactive load is an inductively coupled target load seen by the transmitter.

20. An apparatus, comprising:
means for applying a high loaded quality factor to a matching network of an active transmitter during an amplitude modulation (AM) high state;
means for switching to a low loaded quality factor for the matching network during an AM low state;
means for selecting different impedances for the high loaded quality factor based on different data rates, wherein the different impedances for the high loaded quality factor include impedance values for a source impedance and a reactive load impedance; and
means for selecting different impedances for the low loaded quality factor based on different data rates, wherein the different impedances for the low loaded quality factor include impedance values for the source impedance and the reactive load impedance.

21. The apparatus of claim 20, wherein the high loaded quality factor and the low loaded quality factor are produced by changing the source impedance with respect to a matching network impedance.

22. The apparatus of claim 20, further comprising means for switching a quality factor of a reactive load between the AM high state and the AM low state, wherein the reactive load is an inductively coupled target load seen by the transmitter.

23. A computer-program product, the computer-program product comprising a non-transitory computer-readable medium having instructions thereon, the instructions comprising:
code for causing an electronic device to apply a high loaded quality factor to a matching network of an active transmitter during an amplitude modulation (AM) high state;
code for causing the electronic device to switch to a low loaded quality factor for the matching network during an AM low state;
code for causing the electronic device to select different impedances for the high loaded quality factor based on different data rates, wherein the different impedances for the high loaded quality factor include impedance values for a source impedance and a reactive load impedance; and
code for causing the electronic device to select different impedances for the low loaded quality factor based on different data rates, wherein the different impedances for the low loaded quality factor include impedance values for the source impedance and the reactive load impedance.

24. The computer-program product of claim 23, wherein the high loaded quality factor and the low loaded quality factor are produced by changing the source impedance with respect to a matching network impedance.

25. The computer-program product of claim 23, further comprising code for causing the electronic device to switch a quality factor of a reactive load between the AM high state and the AM low state, wherein the reactive load is an inductively coupled target load seen by the transmitter.

* * * * *